United States Patent Office 3,451,257
Patented June 24, 1969

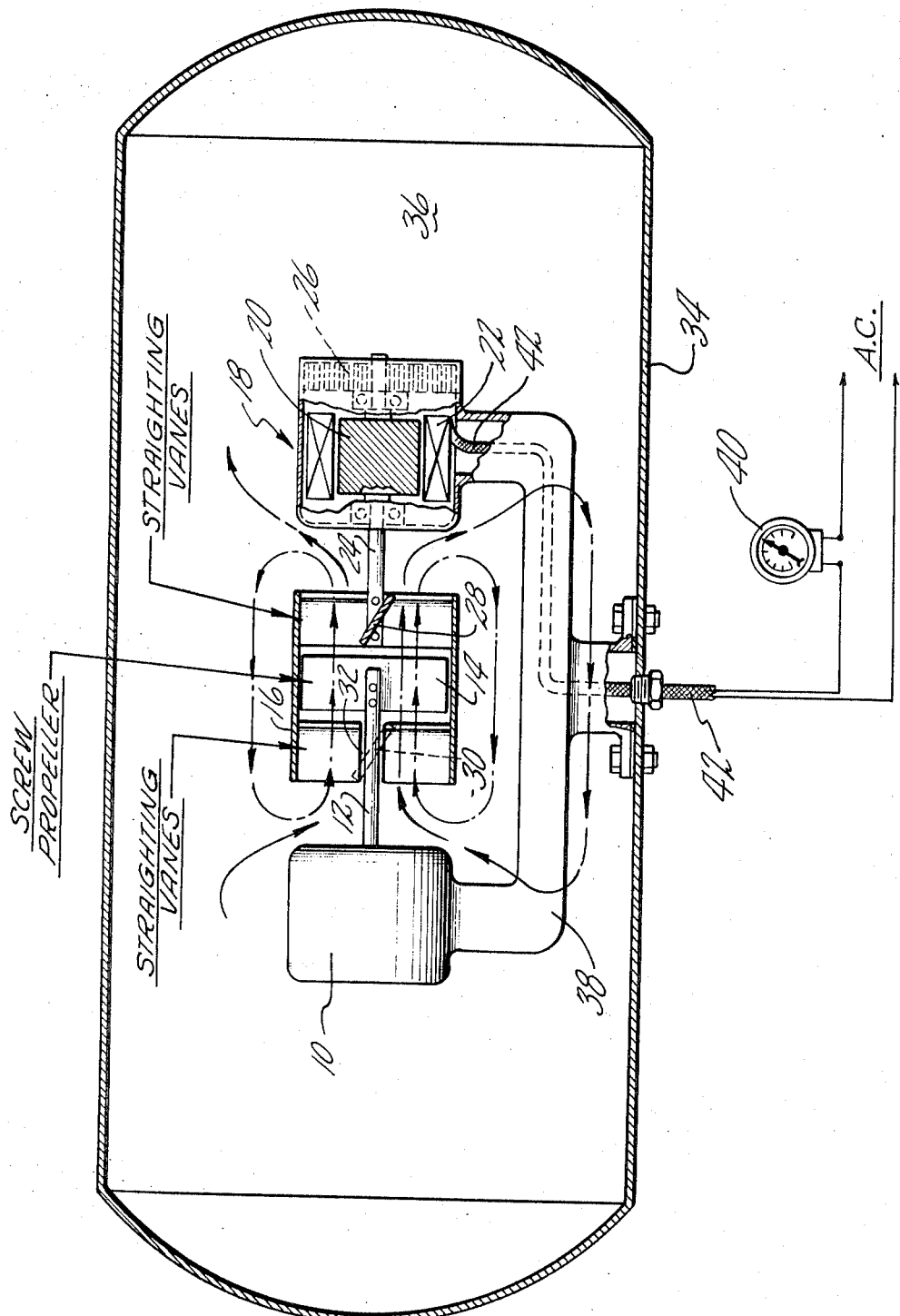

3,451,257
SUPERCRITICAL STORED MASS SENSOR
David C. Jennings, Windsor Locks, Conn., assignor to United Aircraft Corporation, East Hartford, Conn., a corporation of Delaware
Filed Mar. 21, 1966, Ser. No. 535,940
Int. Cl. G01n 9/34
U.S. Cl. 73—32                              2 Claims

ABSTRACT OF THE DISCLOSURE

Apparatus for determining the mass content of a body of stored supercritical fluid includes a tank of known volume on which a duct is supported in the fluid. A shaft fixed to one end of the duct in the longitudinal axis of the latter is journalled in bearings supported by the tank. A constant speed motor supported by the tank has a shaft which is extended into the duct at the other end of the duct and has a screw propeller on its extended end located adjacent the midpoint of the duct. Straightening vanes are secured to the duct internally thereof at each of its ends upstream and downstream of the propeller and a torsion spring acts to bias the duct against the rotational effect of the fluid stream on the duct. An angle sensor has a magnetic core rotatable with the duct which gives a measure of the torque exerted on the duct by the fluid and hence a measure of the density of the fluid.

---

This invention relates to a device for measuring the mass of a fluid stored at supercritical conditions in a tank of known volume.

In spaceflight where conditions of weightlessness are expected to be encountered, a stored cryogenic fluid may be raised to a pressure above the critical point, a condition that may be termed supercritical. In the supercritical condition liquid and vapor interfaces are avoided while density remains high. In this way the difficulties associated with controlling the flow of a two phase fluid in weightlessness are avoided without a severe penalty in terms of additional storage volume. Measurement of the mass contents of a reservoir of stored supercritical fluid is difficult because large changes in density can occur with slight change of either pressure or temperature. Consequently normal accuracies of temperature and pressure gages do not permit the computation of accurate density or stored mass in a fixed volume.

It is therefore an object of this invention to provide a device capable of measuring the mass of fluid in a tank near the critical point whether it be liquid or gas or a mixture of the two by directly sensing the density of the fluid.

A further object of this invention is to provide such a device which is accurate, reliable in operation and reasonable in cost.

A still further object of this invention is to provide a device of this type in which the entire mechanism, with the exception of an electrically operated gage which may be located remotely, is contained within the tank and is thus protected at all times.

A still further object of this invention is generally to improve devices for measuring the mass of a supercritical stored fluid.

At constant velocity and rotational speed the torque on a screw propeller is proportional to the density of the fluid in which it is immersed. Advantage is taken of this principle to sense the fluid density of the supercritical fluid in the tank. It may also sense the density of a mixture of liquid and gas stored at nearly critical conditions since the gas and the liquid in the tank are at approximately the same density. Once the density of the fluid is known, the mass, which is the product of the density and the volume, is readily determined if the volume of the storage tank is known.

It is therefore a further object of this invention to provide a fluid density sensor, as above described, for use in obtaining the mass of a known volume of supercritical fluid.

These and other objects and advantages of the invention will become evident or will be particularly pointed out in connection with the following detailed description of one embodiment of the invention illustrated in the accompanying drawing.

In this drawing the single figure shows diagrammatically a preferred embodiment of the invention. In this figure, 10 is a constant speed synchronous motor having an axial shaft 12 to which a screw propeller 14 is attached. A cylindrical housing, or duct, 16 forms a shroud for the propeller which is located about midway between the ends of the duct. An electrical angular position sensor 18 supports the duct at the opposite end of the duct from the propeller driving motor and consists essentially of a movable iron core 20 associated with a field coil 22. Sensor 18 and motor 10 are supported by a common structure 38 attaching them to the interior of the tank 34. Normally core 20 lies in the same planes as the field coil 22, i.e., the core and the field are flat and lie in planes parallel to the plane of the drawing. The core is mounted on a shaft 24 for limited rotary movement out of the planes of field 22. This movement is controlled by a torsion spring 26, the inner end of which is secured to the inner end of shaft 24 and the outer end of which is fixed to the frame of the sensor 18. The other end of shaft 24 carries radial straightening vanes 28, internal of the duct, which are secured to the adjacent end of duct 16 downstream of the propeller and support the duct for rotary movement with shaft 24. A second set of straightening vanes 30 is located in duct 16 upstream of the propeller. Vanes 30 are fixed to duct 16 and have an axial passage 32 through which shaft 12 extends and in which the latter is free to rotate. As a result of this construction it will be clear that duct 16 carries radial straightening vanes 28 and 30 at its opposite ends and that this assembly is mounted on shaft 24 together with core 20 for limited movement about the axis of that shaft as controlled by the torsion spring 26.

The device above described is suitably supported within tank 34 in which a supercritical fluid 36 is stored. The volume flow through duct 16 is constant because motor 10 is a synchronous motor and hence runs at constant speed. The circulatory path of the fluid external to duct 16 has stored kinetic energy with both linear and angular momentum. Within the duct 16, however, the angular momentum of the fluid is removed by straightening vanes 28 and 30. Since the straightening vanes 28 and 30 are restrained by torsion springs 26, the assembly including the straightening vanes, the duct, the core and shaft 24 will rotate through an angle proportional to the torque transmitted by the fluid in the duct to vanes 28 and 30. Since this torque exerted on the straightening vanes is a measure of the torque on the propeller as a result of its rotation at constant velocity in the stored fluid, by measuring the torque on the straightening vanes an accurate measure of the density of the stored fluid is obtained. This is accomplished by measuring the angle through which core 20 of the sensor moves. This angle is accurately measured and indicated on a suitable instrument 40 which is connected in series with coil 22 in an A.C. circuit 42 and is responsive to variations in the reactance of field coil 22.

It will be evident that as core 20 moves relative to coil 22 the reactance will vary and that the measure of this reactance affords an accurate measure of the torque exerted on shaft 24.

From the above description of a preferred embodiment of the invention it will be evident that a very simple and reliable device has been provided which enables the mass of a supercritical stored fluid to be ascertained.

It will be further evident that, with the exception of the meter for indicating changes in the reactance of the coil, the device is wholly contained within the tank in which the fluid is stored.

A further advantage of the density sensor of this invention results from circulating the fluid through the sensor, since as a result of this fluid circulation the temperature stratifications are minimized, tending to improve accuracy of measurements.

It should also be noted that the supercritical fluid mass sensor of this invention can be used irrespective of the proportions of liquid and gas in the stored fluid.

While only one form of the device has been shown by way of example, it will be understood that many variations in the construction and arrangement of the various parts of the device are contemplated within the scope of the appended claims. For example the core of the angle position sensor may be fixed and the coil made rotatable with shaft 24, with the outer end of the torsion spring suitably fixed to other fixed structure. One set of straightening vanes might be omitted. Also the duct 16 may be fixed and the straightening vanes carried by shaft 24 in some other manner, although the construction shown has some advantages.

I claim:

1. Mechanism for determining the mass contents of a body of stored supercritical fluid comprising a tank of known volume, a cylindrical duct submerged in the fluid in said tank, a first shaft secured to one end of said duct in the longitudinal axis of the latter, bearings carried by said tank in which said shaft is journalled, a constant speed motor external of said duct including a second shaft extended axially within said duct at the other end of said duct having a screw propeller on its extended end located adjacent the midpoint of said duct for moving a stream of fluid spirally through said duct, means for straightening said fluid stream comprising sets of vanes secured to said duct internally thereof at each end of the latter both upstream and downstream of said propeller and rotatable with said duct, a torsion spring for biasing said duct against the rotational effect of said fluid stream on said vanes, and means for giving a measure of the density of the fluid in said stream including an angle sensor having a magnetic core and a winding, one of which is mounted on said first mentioned shaft and is angularly movable with the latter and said duct.

2. Mechanism for determining the mass contents of a body of stored supercritical fluid comprising a tank of known volume, a U-shaped support fixed to said tank within the latter, an electrical sensor carried by one arm of said support including coil and core elements, one of which is fixed to said support, a shaft to which the other element of said sensor is fixed, bearings carried by said one arm of said support in which said shaft is journalled, a cylindrical duct concentric with said shaft and fixed thereto located between the arms of said support, a constant speed motor carried by the other arm of said support external of said duct having a second shaft extended axially into said duct, a screw propeller on said second shaft located within said duct adjacent the midpoint of the latter for directing a spiral stream of fluid through said duct, sets of straightening vanes fixed to said duct internally of the latter and rotatable therewith, one set located upstream of said propeller and the other located downstream of the latter, and a torsion spring having one end fixed to said first mentioned shaft and its other end fixed to said support for resisting the torque exerted on the straightening vanes by the fluid circulated through said duct by said propeller.

References Cited

UNITED STATES PATENTS

| 1,664,752 | 4/1928 | Konig | 73—30 |
| 2,360,546 | 10/1944 | Cardwell | 73—32 |
| 2,465,775 | 3/1949 | White | 73—30 |
| 2,714,310 | 8/1955 | Jennings. | |

RICHARD C. QUEISSER, *Primary Examiner*.

JOHN K. LUNSFORD, *Assistant Examiner*.

U.S. Cl. X.R.

73—30